Figure 1:
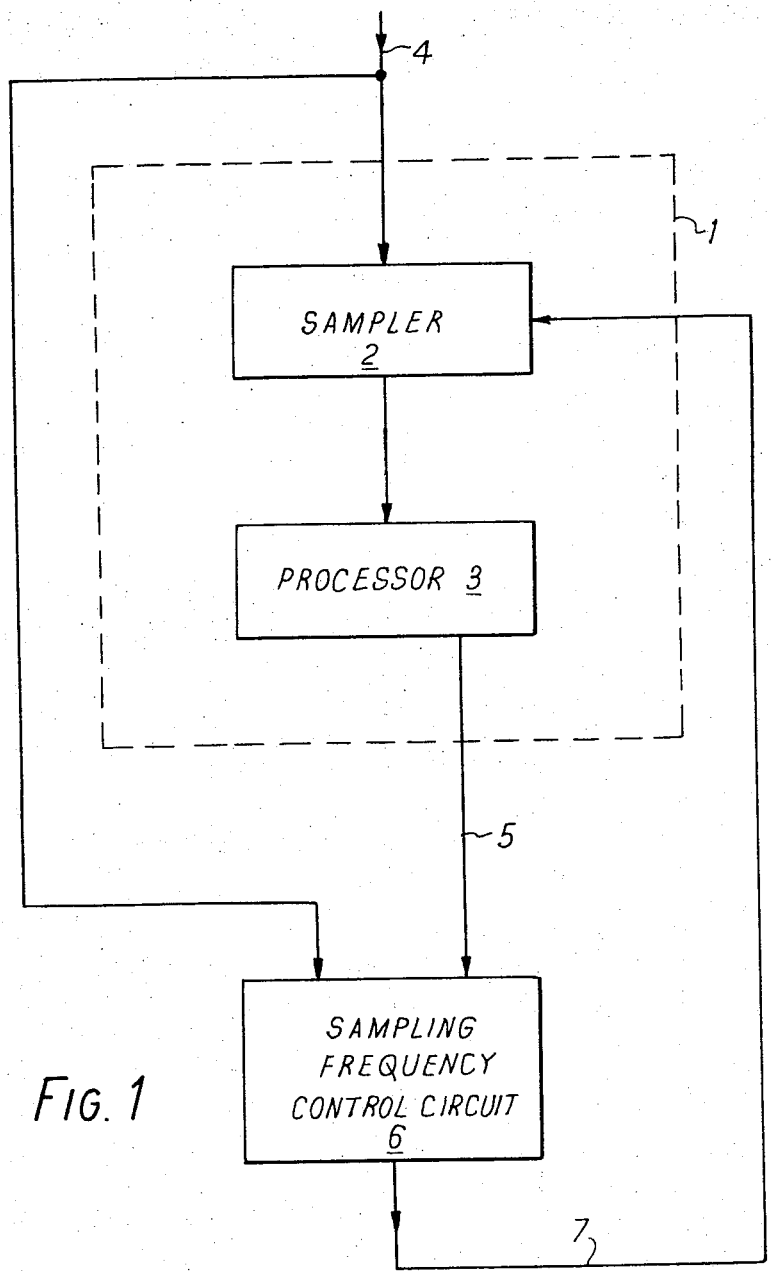

United States Patent [19]
Musgrave et al.

[11] 3,864,639
[45] Feb. 4, 1975

[54] FREQUENCY CONTROL CIRCUITS

[75] Inventors: Gerald Musgrave, Tong Park Baildon; Alan Michael Hayes, Shipley, both of England

[73] Assignee: George Kent Limited, Luton, Bedfordshire, England

[22] Filed: Feb. 20, 1973

[21] Appl. No.: 333,711

[30] Foreign Application Priority Data
Feb. 24, 1972 Great Britain...................... 8643/72

[52] U.S. Cl................................. 328/151, 328/160
[51] Int. Cl. ............................................ H03k 5/00
[58] Field of Search ............ 328/151, 160; 307/235

[56] References Cited
UNITED STATES PATENTS
3,440,548  4/1969  Saltzberg ............................ 328/151
3,750,036  7/1973  Burrow et al. ...................... 328/151

Primary Examiner—Stanley D. Miller, Jr.
Assistant Examiner—B. P. Davis

[57] ABSTRACT

A sampling frequency control circuit for controlling the frequency at which input signal means are sampled by apparatus for sampling and processing data, comprising signal generating means adapted to generate an output signal dependent upon an output signal from the said apparatus and means for supplying the output signal of the signal generating means to the said apparatus to control the sampling frequency thereof.

9 Claims, 2 Drawing Figures

FREQUENCY CONTROL CIRCUITS

This invention relates to sampling frequency control circuits, and more particularly, to a sampling frequency control circuit for controlling the frequency at which input signal means are sampled by apparatus for sampling and processing data.

The present invention consists in a sampling frequency control circuit for controlling the frequency at which input signal means are sampled by apparatus for sampling and processing data, comprising signal generating means adapted to generate an output signal dependant upon an output signal from the said apparatus and means for supplying the output signal of the signal generating means to the said apparatus to control the sampling frequency thereof.

The invention further consists in a sampling frequency control circuit for controlling the frequency at which an input signal is sampled by apparatus for sampling and processing data, comprising means for providing a pre-set signal representative of a desired value of output signal from the sampling and processing apparatus, comparator means for comparing and providing an output signal dependant upon the relationship between the pre-set signal and the output signal of the sampling and processing apparatus, frequency correction means supplied with and adapted to employ the output signal of the comparator means and a signal dependant upon the sampling frequency so as to provide an output signal representative of a corrected sampling frequency, signal generating means supplied with the output signal of the frequency correction means and adapted thereby to generate an output signal dependant upon a corrected value of sampling frequency and means for supplying the output signal of the signal generating means to the sampling and processing apparatus thereby to adjust the sampling frequency to a value as to bring the output signal of the sampling and processing apparatus into correspondence with the pre-set signal.

Preferably, the frequency correction means comprise an adder/subtractor unit having a first input connected with the output of the comparator means and having its output connected to a store adapted to store a signal representative of the sampling frequency and to supply said stored signal to the signal generating means and to a second input of the adder/subtractor unit which is adapted to operate on the signals at its first and second inputs and provide an output signal representative of a corrected sampling frequency said output signal from the adder/subtractor unit replacing in the store the stored signal representative of sampling frequency.

Advantageously, the sampling frequency control circuit of the invention as well as the apparatus in conjunction with which it is used, said apparatus being for the sampling and processing of data, are embodied in an all-digital form. In use the control circuit of the invention forms together with the sampling and processing apparatus a closed-loop control network. The sampling and data processing apparatus may, for example, be a cross-correlator producing an output signal representative of the time delay between a pair of input signals, such output signal being in the form of a binary number equivalent to a multiple of the period of the frequency at which the input signals are sampled. In this case, the sampling frequency is varied whenever the time delay changes so as to keep the binary number constituting the output signal from the correlator constant. The output signal from the sampling frequency control circuit in one embodiment of the invention is so arranged that its frequency, when the output of the apparatus for sampling and processing data is constant, is inversely proportional to the time delay. Therefore, if the time delay is associated with a velocity which the correlator is being used to measure, for example, a fluid flow velocity or a strip movement velocity, the frequency of the output signal from the sampling frequency control circuit is directly proportional to the velocity. Alternatively, the sampling frequency control circuit may be arranged so that its output frequency is directly proportional to the time delay.

Figure 2:
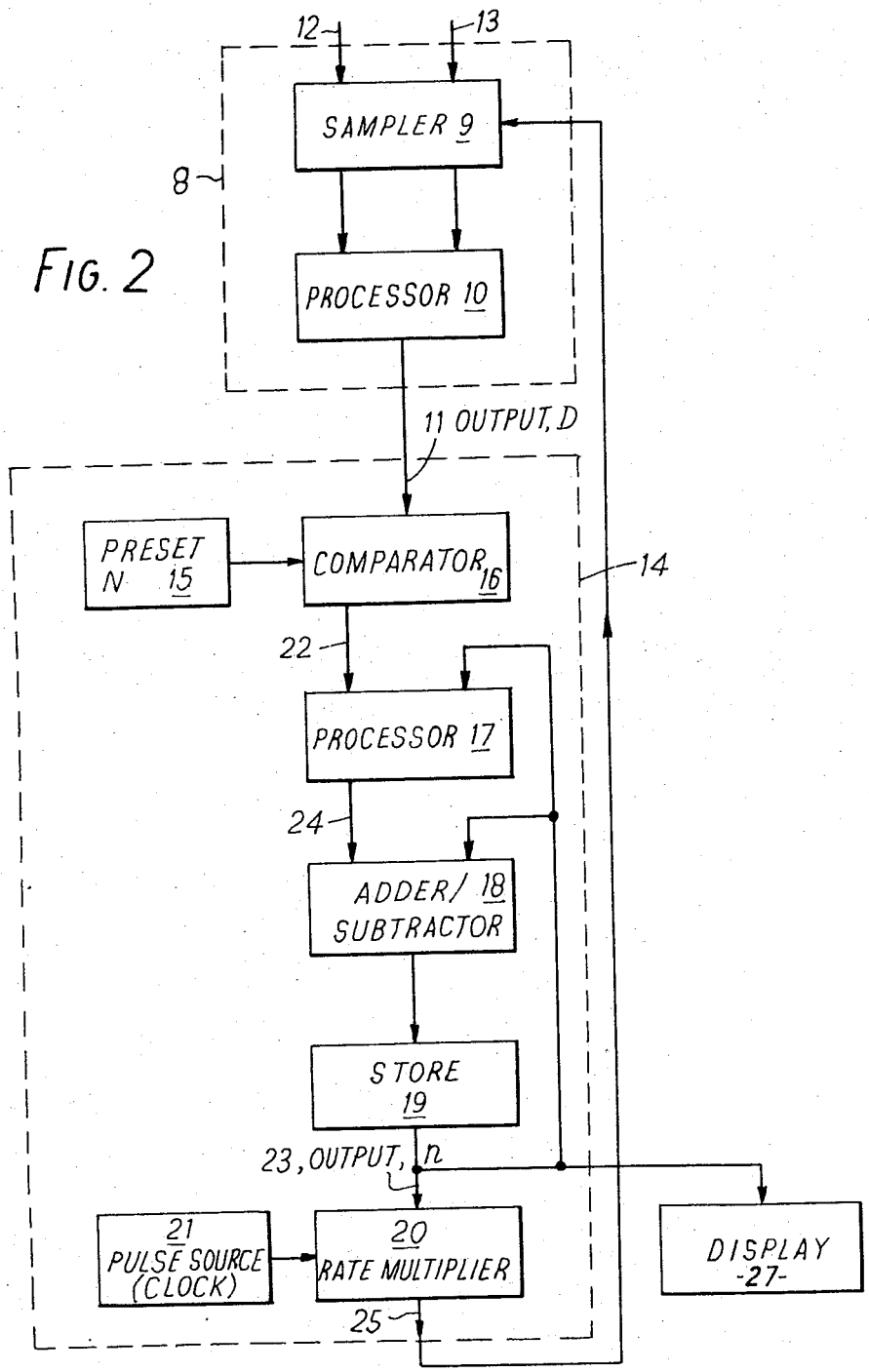

The invention will now be described by way of example with reference to the accompanying drawings in which:

FIG. 1 is an outline block diagram of a sampling frequency control circuit in accordance with this invention for controlling the frequency at which input signal means are sampled by apparatus for sampling and processing data, and FIG. 2 is a more detailed block diagram of the apparatus depicted in FIG. 1.

Referring first to FIG. 1, apparatus 1 for sampling and processing data comprises a sampler 2 connected at its output to a processor 3. The sampler samples periodically an input signal or input signals supplied thereto by way of a lead 4 whilst the processor 3 operates on the sampled signal or signals to provide an output signal on a lead 5. The output signal of the processor is supplied, together, optionally, with the input signal or signals on the lead 4 to a sampling frequency control unit 6 which provides an output signal on a lead 7 which controls the sampling frequency of the apparatus 1.

FIG. 2 shows the construction of the sampling frequency control circuit in more detail, in an application in which the apparatus for sampling and processing data is a cross correlator 8 which produces an output signal related to the sampling frequency used and representative of the time delay between a pair of input signals which have to be cross-correlated.

The cross correlator 8 comprises a sampler 9 and a processor 10 and produces an output signal on a lead 11. The output on the lead 11 is a signal representative of a number D, in binary coded form. The number D is a measure of the time delay T between a pair of input signals supplied to the correlator on leads 12 and 13 and sampled by the sampler 9: it is a integral multiple of the period of the sampling frequency R of the sampler. A particular type of cross correlator which may be controlled by the sampling frequency control unit of this invention is described in co-pending Patent application Ser. No. 220,017. However, use of the frequency control unit is not restricted to this particular correlator and may be used with any other correlator which employs sampling of the input signals, or indeed with any other signal sampling and processing apparatus. When the sampling frequency control circuit herein described is used with the correlator disclosed in the said co-pending application, the pulse train output is used in place of the low frequency clock pulses used in the correlator to control the sampling and feeding in of the input signals to the storage means.

The sampling frequency control circuit 14 comprises a pre-set circuit 15 having a binary coded output which is connected to one input of a comparator 16, the other input of which is connected to receive the output binary coded signal D from the correlator 8 on the lead 11. An output error signal in binary form from the comparator on a lead 22 is connected to a first input of a processor 17 comprising a combinational logic circuit including shift register and adder units. The output from the processor 17 which is in binary coded form is supplied via a lead 24 to a first input of an adder/subtractor unit 18. The adder/subtractor unit 18 is connected to the input of a store 19 having a binary coded output on a lead 23 which is connected to the control input of a rate multiplier 20, to the input of a visual display 27, and back to second inputs of both the processor 17 and the adder/subtractor unit 18. A generator 21 of clock pulses supplies a constant frequency pulse input to the rate multiplier 20 and the output of the rate multiplier is connected by a lead 25 to the sampling input of the sampler 9 of the correlator 8.

The comparator 16 serves to provide an output signal representative of the difference between the signal D at the output of the processor 10 and the pre-set signal N which represents a desired value of signal D. The comparator 16 can accordingly be a subtractor unit. The signal D is related to the sampling frequency R and the time delay T between the signals on leads 12 and 13 by the equation $$D = R.T$$

Accordingly, the number D will change if the time delay T changes, as would happen as a result of change of flow through a tube or change of a strip speed, and the value of the number D can accordingly be restored to a desired value by appropriate change of the sampling frequency R.

The processor 17, adder/subtractor unit 18 and store 19 constitute a frequency correction means of which the processor 17 is a desirable, although not essential component, the purpose of which is to render linear the relationship between the correction to be applied to the sampling frequency upon change in the value of the signal D.

It will be appreciated from the above mentioned equation that the change in the value of R upon change in T required to keep the value of D constant is a variable and, therefore, the relationship between the correction to be applied to the sampling frequency upon change in the value of D is, in the absence of the processor 17, non-linear. The processor is desirably present to linearise this relationship.

The binary coded output of the store 19, the value of which is also stored in store 19 is supplied to the rate multiplier 20 which is also supplied with clock pulses from the generator 21. The rate multiplier suitably an integrated circuit of type Ser. No. 7,497 of Texas Instruments Co. provides an output on the lead 25 which is a pulse train the frequency of which is proportional to the output number of the store 19.

It will be appreciated that the pulse source 21 and rate multiplier 20 together constitute a signal generating means for producing an output signal dependent upon a corrected value of the sampling frequency needed in consequence of a change in the time delay T between signals on the leads 12 and 13.

In operation of the particular apparatus described the sampling rate R is controlled so that the number D is kept constant and equal to the chosen, pre-set number N for all values of time delay T between the signals on the leads 12 and 13. The comparator 16 thus generates an error signal on the lead 22 if the number D is not equal to the number N, the error signal on the lead 22 being a measure of the difference between the numbers D and N.

If the error signal is not zero, indicating that D and N are not equal, the processor 17 computes a correction signal from the error signal on the lead 22 and from a binary coded number $n$ stored in the store 19 and fed back to the processor 17 by the lead 23. This correction signal is another number C and is added to or subtracted from the number $n$, as appropriate, by the adder/subtractor 18, and the new value, $n'$ say, is entered into the store 19, overwriting the previous value $n$. The repetition rate of the pulse train on the lead 25, which was previously proportional to the value $n$ fed to the control input of the rate multiplier from the store 19, is now proportional to $n'$. The change in the frequency of the pulse train fed to the sampler 9 produces a change in the number D, and the processor 17 is so arranged that the correction signal C will have caused the number $n$ (and therefore the sampling rate) to be changed in the sense such that the new, changed value of D will be closer to the pre-set number N than was the previous value of D, assuming, of course, that the time delay between the signals 12 and 13 has meanwhile remained the same. It will be apparent that the closed loop system formed by the correlator 8 and sampling frequency control unit 14 is such that D will be automatically changed in value until a steady state is attained in which D is equal to N, the error signal on the lead 22 is zero, the correction signal on the lead 24 is zero, and the sampling rate R is constant.

When the system has attained this steady state, if the correlator input signals change so that a particular time delay $T_1$ changes to a new steady value $T_2$, the number D will change proportionally. The sampling frequency control unit 14 then detects the change in D and adjusts the sampling rate R as described above until D once again is equal to N. When this has been done, the ratio of the new sampling rate $R_2$ to the previous sampling rate $R_1$ is inversely proportional to the ratio of the new time delay $T_2$ to the previous time delay $T_1$. This is because, for both the old and new time delays, $N = D = R_1.T_1 = R_2.T_2$ when the whole system is in the steady state, i.e., when the error signal on the lead 22 is zero.

For any time delay T, when the system is in the steady state and $D = N$, the sampling rate R is inversely proportional to the time delay T, and since R is directly proportional to the number $n$ preserved in the store 19, $n$ is also inversely proportional to T.

In various particular applications of the invention, the signals on the leads 12 and 13 are derived from positions spaced apart in the direction of flow of a fluid, or in the direction of movement of a moving web, such as a strip of paper or rolled steel. The time delay T is thus representative of a velocity parameter; in the case of fluid flow the mean fluid flow velocity between the two points. Thus, as the flow velocity is inversely proportional to the time delay T, both the sampling rate R and the number $n$ preserved in the store 19 are directly proportional to the flow velocity D in the steady state when $D = N$. Therefore, the number $n$, which is fed to the display 27, provides a measure of the fluid flow velocity. Provided the display 27 is suitably calibrated, it will display the flow velocity directly.

In a modified form of the sampling frequency control unit 14 shown in FIG. 2, the rate multiplier 20 is replaced by a counter which is arranged to count from 1 to the number n in the store 19 and to then reset to 1 and to repeat the counting operation. Each time the counter is reset, a pulse is sent out to the lead 25. Clearly, the time interval between successive pulses will be directly proportional to the number n. In this modification, the pulse train on the lead 25, which is again fed to the sampler 9 for use directly to control sampling, is inversely rather than directly proportional to the number n. The processor 17, in this modified unit, is arranged to produce a correction signal C' in the opposite sense to the number C in the illustrated circuit to adjust the number n so that, once again, the number D tends to become equal to the number N. The operation of the modification is, on the whole, much the same as that of the embodiment shown, except that, in this case, the number n and the sampling frequency R are directly proportional to the time delay T and it is the time delay which is displayed on the display unit 27 rather than a veloctiy. This modification may be employed in applications where the time delay between the signals, or a parameter proportional thereto, is of major interest, e.g. in a wave-energy position finding system such as radar or sonar.

In the above description, for the sake of convenience, the apparatus for sampling and processing data and the sampling frequency control circuit have been described as if they were discrete units. Although they may, in fact, be embodied as physically discrete units, it should be appreciated that they may be physically arranged in a unitary form.

The apparatus described above is preferably embodied in electronic form. However, it should be appreciated that in some applications it might not be so embodied. For example, in those applications associated with fluid flow measurement, the invention might be more conveniently embodied in fluidic form.

It should be emphasised that although the present invention has been more particularly described with reference to use with a cross correlator, and to a cross correlator which measures the time delay between two input signals, it may also be used with other types of sampled data system or with cross correlators which operate in a manner other than to measure time delay between two input signals. The invention may be employed whenever closed loop control of a pulse repetition rate is required.

We claim:

1. A sampling frequency control circuit for controlling the frequency at which an input signal is sampled by apparatus for sampling and processing data, comprising means for providing a pre-set signal representative of a desired value of output signal from the sampling and processing apparatus, comparator means for comparing and providing an output signal dependent upon the relationship between the pre-set signal and the output signal of the sampling and processing apparatus, frequency correction means supplied with and adapted to employ the output signal of the comparator means and a signal dependent upon the sampling frequency so as to provide an output signal representative of a corrected sampling frequency, signal generating means supplied with the output signal of the frequency correction means and adapted thereby to generate an output signal dependent upon a corrected value of sampling frequency and means for supplying the output signal of the signal generating means to the sampling and processing apparatus thereby to adjust the sampling frequency to a value as to bring the output signal of the sampling and processing apparatus into correspondence with the pre-set signal.

2. A sampling frequency control circuit as claimed in claim 1, wherein the frequency correction means comprise an adder/subtractor unit having a first input connected with the output of the comparator means and having its output connected to a store adapted to store a signal representative of the sampling frequency and to supply said stored signal to the signal generating means and to a second input of the adder/subtractor unit which is adapted to operate on the signals at its first and second inputs and provide an output signal representative of a corrected sampling frequency said output signal from the adder/subtractor unit replacing in the store the stored signal representative of sampling frequency.

3. A sampling frequency control circuit as claimed in claim 2, wherein linearizing means are interposed between the comparator and the adder/subtractor unit to (line-arise) render linear the relationship between changes in the signal at the first input of the adder/subtractor unit (in relation to) and changes of output signal at the sampling and processing apparatus at differing values of output signal.

4. A sampling frequency control circuit as claimed in claim 3, wherein the signal generating means comprises a source of clock pulses and a rate multiplier adapted to be supplied with pulses from the clock pulse source and with the output signal of the frequency correction means thereby to provide an output signal representative of the corrected value of the sampling frequency.

5. A sampling frequency control circuit as claimed in claim 3, wherein the signal generating means comprise a source of clock pulses and a counter supplied with pulses from the clock pulse source and with the output of the frequency correction means, the counter providing output pulses at intervals proportional to the value of the output signal at the frequency correction means.

6. A sampling frequency control circuit as claimed in claim 4 wherein the input signal from the sampling and processing apparatus, the pre-set signal and the frequency correction means output signal are each in multi-bit binary form.

7. A sampling frequency control circuit as claimed in claim 6, wherein display means are provided for displaying a value represented by the output of the frequency correction means.

8. A sampling frequency control circuit as claimed in claim 5, wherein the input signal from the sampling and processing apparatus, the pre-set signal and the frequency correction means output signal are each in multi-bit binary form.

9. A sampling frequency control circuit as claimed in claim 5, wherein display means are provided for displaying a value represented by the output of the frequency correction means.

* * * * *